United States Patent [19]
Ruckwardt

[11] Patent Number: 5,464,179
[45] Date of Patent: Nov. 7, 1995

[54] TWO-PIECE HOLDING ASSEMBLY MADE OF PLASTIC

[75] Inventor: Hans-Werner Ruckwardt, Eisenberg, Germany

[73] Assignee: TRW United Carr GmbH & Co., KG, Enkenbach-Alsenborn, Germany

[21] Appl. No.: 79,078

[22] Filed: Jun. 16, 1993

Related U.S. Application Data

[63] Continuation of Ser. No. 784,454, Oct. 25, 1991, abandoned.

[30] Foreign Application Priority Data

Oct. 30, 1990 [DE] Germany ............................ 40 34 545.9

[51] Int. Cl.$^6$ ......................................................... F16L 3/22
[52] U.S. Cl. ............................ 248/68.1; 248/73; 248/74.2
[58] Field of Search ........................... 248/65, 68.1, 73, 248/74.1–74.4

[56] References Cited

U.S. PATENT DOCUMENTS

| | | | |
|---|---|---|---|
| 3,894,706 | 7/1975 | Mizusawa | 248/74.2 X |
| 4,244,544 | 1/1981 | Kornat | 248/68.1 |
| 4,450,605 | 5/1984 | Schäty | 248/74.2 X |
| 4,467,988 | 8/1984 | Kraus | 248/68.1 |
| 4,541,602 | 9/1985 | Potzas | 248/68.1 X |
| 4,550,891 | 11/1985 | Schäty | 248/68.1 |
| 4,655,424 | 4/1987 | Oshida | 248/68.1 X |
| 4,840,333 | 6/1989 | Nakayama | 248/68.1 |
| 4,881,705 | 11/1989 | Kraus | 248/68.1 X |
| 5,002,243 | 3/1991 | Kraus et al. | 248/68.1 |
| 5,033,701 | 7/1991 | Kraus | 248/68.1 |

FOREIGN PATENT DOCUMENTS

| | | | |
|---|---|---|---|
| 8213664 | 8/1982 | Germany . | |
| 2200426 | 8/1988 | United Kingdom | 248/68.1 |

Primary Examiner—Ramon O. Ramirez
Assistant Examiner—Derek J. Berger
Attorney, Agent, or Firm—Daniel G. Blackhurst

[57] ABSTRACT

The invention concerns a two-piece holding assembly made of plastic for mounting of at least one tube-shaped part such as a vehicle fuel line or the like. The assembly includes an outer dish element 2 of hard plastic material which is attachable to a support via a mounting zone. An inner dish-like element 3 formed of soft plastic material and having at least one storage location 5 for acceptance of the tube-shaped part is received in outer dish element 2. In the preferred arrangement, the inner dish-like element 3 is attached on both sides of storage location 5 via an anchorage 6, 6' to the outer dish-like element 2. Between inner dish-like element 3 and outer dish-like element 2 in the area about the storage location 5, there exists an open transverse free space 7.

6 Claims, 1 Drawing Sheet

TWO-PIECE HOLDING ASSEMBLY MADE OF PLASTIC

REFERENCE TO PRIOR APPLICATION

This application is a continuation application of U.S. Ser. No. 07/784,454, filed on Oct. 25, 1991 now abandoned.

BACKGROUND OF THE INVENTION

The invention is directed to a two-piece holding assembly made of plastic for mounting of at least one tube-shaped part. The assembly comprises an outer dish of hard plastic material attachable to a support via a mounting zone and carrying an inner dish of soft plastic material which is inserted therein and which has at least one storage location for acceptance of the tube-shaped part.

Within the state of the art, somewhat similar two-piece holding assemblies of plastic are already known (German Printed Specification 39 02 498). In this known arrangement, the outer dish consisting of hard material has an open area in the vicinity of the support, into which is embedded in an unmounted state an inner dish equipped with corresponding storage locations. This construction is such that there is not always the assurance that the vibrations originating from the tube-shaped parts will not be transferred to the support, for example, the body of a motor vehicle. It is also known in the prior art to embed tube-shaped parts via their circumference in soft elements which are, in turn, embedded in a hard outer support dish (German Printed Specification 37 08 864, U.S. Pat. No. 4,347,998). Moreover, it is known in the art to position tube-shaped parts merely between two parts connected with each other in a hinge-like manner (German Petty Patent 82 13 664.5).

In contrast to these prior holding assemblies, it is the object of the present invention to create a two-piece holding assembly which guarantees that no vibrations can be transmitted via the tube-shaped parts to the support to which the two-piece holding element is attached.

SUMMARY OF THE INVENTION

According to the invention, the noted object is achieved by having the inner dish-like element attached on both sides of the storage location via anchorage points to outer dish-like element and providing an open transverse free space between the inner dish and the outer dish in the area of the storage location. This gives the assurance that the storage locations of the inner dish-like elements, which hold the tube-shaped parts and which are made of soft material, can move without restriction due to the free space. Thus, beneficially, no vibration can be transmitted to the support via the outer dish-like element made of hard material.

Relative to a holding assembly in which the support zone is arranged between two storage locations, the inner dish-like element can overlap the support zone. In this arrangement, four anchorage points may be provided. Two anchorage points can be arranged above the support zone and two anchorage points can be located at a spaced distance laterally of the support zone. Thus, each storage location of the inner dish-like element is supported merely via two anchorage points against the outer dish-like element so that thereby, likewise, transmission of undesired vibrations to a support is prevented. The anchorages may, for instance, be formed by grooves or slots having enlarged end zones for receiving corresponding engagement elements with thickened end zones formed on the connecting piece. In such an arrangement, the anchorages arranged on both sides of a storage location between inner and outer dish-like elements may be pointed in opposite directions.

In another version of the invention, the outer dish-like element may be shaped like a "U" in the area of the storage location. The inner leg can thus form part of the support zone and the outer leg can exhibit a reinforced area for acceptance of the outer anchorage between the outer and inner dish-like elements. Moreover, the support zone may be "T"-shaped and the cross beam, with its two end zones, can exhibit the inner anchorages between outer and inner dish-like elements. As reinforcement, a rib may additionally extend between the outer leg and the reinforced zone. According to another characteristic of the invention, the inner dish-like element, in the area of the storage location, may be ring-shaped and the ring-shaped area can provide an insert aperture for the tube-shaped part to be stored. Portions of the inner dish-like element adjacent the ring-shaped area can pass over at the end into the engagement elements of the inner and outer anchorage. Thus, the tube-shaped part which is to be mounted is properly encircled over a wide area of its circumference in the respective storage location of the inner dish-like element. The ring-shaped area may advantageously exhibit on both sides of the storage location a thickening or lip which reduces the insert aperture. Thus, the tube-shaped part can be clipped into the respective storage location and is satisfactorily retained therein. For further damping and reduction of vibration transmission, a rib may be placed at the inner circumference of the ring-shaped part at a location opposite the insert aperture. In this way, for example, the tube-shaped part is positioned and supported only by contact points in the storage location of the inner dish-like element consisting of soft material. This, likewise, will beneficially assure a damping of vibrations.

The support zone of the outer dish-like element may be designed in known fashion as an aperture for bolt acceptance, as a holding clip, or as a mounting bolt.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
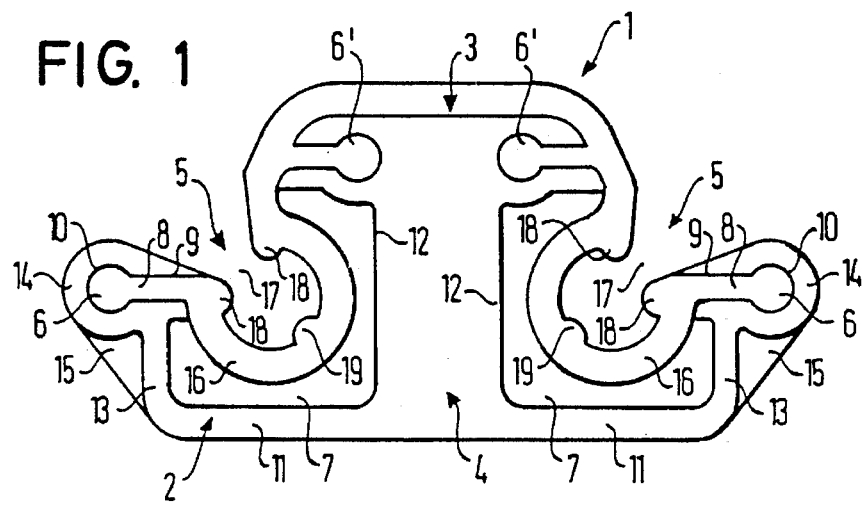
FIG. 1 is a side elevational view of two-piece holding assembly for in accordance with the invention.
Figure 2:
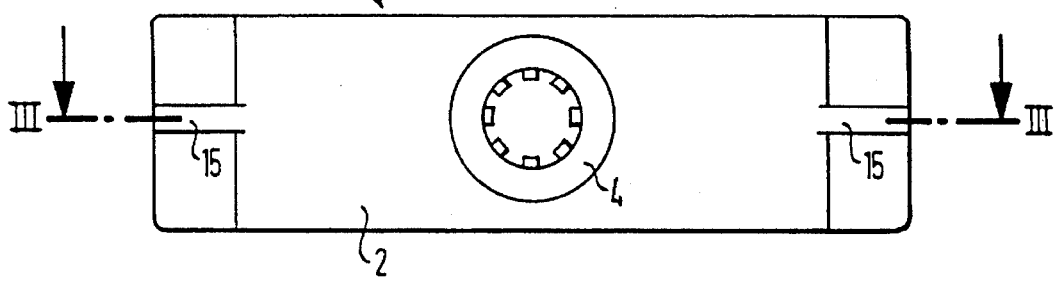
FIG. 2 is a bottom view of the assembly shown in FIG. 1.
Figure 3:
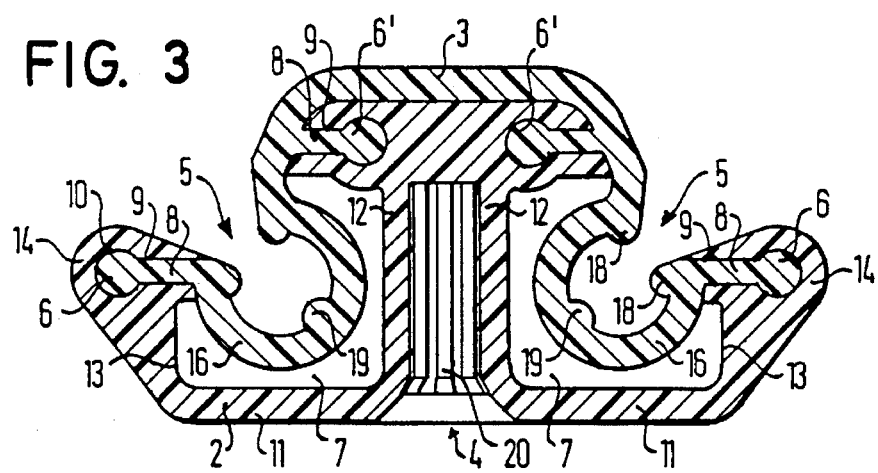
FIG. 3 is a cross-sectional view taken on line III—III of FIG. 2.

Referring more particularly to the drawings wherein the showings are for the purpose of illustrating a preferred embodiment of the invention only, and not for the purpose of limiting same, FIGS. 1 through 3 show the holding assembly 1 as comprising two separate components including an outer dish-like, first component 2 formed of a hard plastic material and having an inner dish-like, second component 3 formed of a softer, and more resilient plastic material carried therein. In the disclosed arrangement, the outer dish-like member 2 provides a zone 4 which allows the assembly to be connected to a subjacent support structure, such as a vehicle frame or body panel (not shown). In the preferred embodiment illustrated in the drawings, there are positioned storage locations 5 on each side of the holding zone 4. These storage locations 5 are formed by the inner dish-like element 3 and provide means for receiving and holding tube-like elements, such as vehicle fuels lines and the like.

As is apparent from FIGS. 1 and 3, the inner dish-like element 3 is attached on both sides of the respective storage locations 5 via anchorage arrangements 6 or 6' at the outer dish-like element 2. It should be noted that, in addition, there is in existence between the inner dish-like element 3 and the outer dish-like element 2, free space or openings 7 which extend transversely of the assembly and surround the respective storage spaces 5 and the portions of the inner dish-like member 3 which defines these storage locations 5.

In the subject embodiment, the anchorages 6 or 6' are formed by transversely extending grooves or slots 9 which are formed in the outer ends of the outer dish-like element 2. The end zones 10 of each of the grooves 9 are of enlarged or under cut form and receive corresponding contact elements 8 which have thickened end zones 6. These contact elements and end zones 6 are formed on the lateral free ends of the inner dish-like element 3. As is evident from FIGS. 1 and 3, the anchorages 6 and 6' are located on opposite sides of their respective storage locations 5. The anchorages between outer dish-like element 2 and inner dish-like element 3 are pointed in opposite directions. Or stated another way, each of the two dish-like elements 6' are directed toward one another and the two anchorages 6 are directed in opposite directions away from one another.

It is also evident from FIGS. 1 and 3 that the outer dish-like element 2 forms somewhat of a U-shaped zone in the area of the respective storage locations 5. The U-shaped zone 11 has an inner leg 12 which forms Dart of the support region 4 and an associated outer leg 13. The outer leg 13 joins and supports a reinforced zone 14 which accepts and forms the outer anchorage 6 between outer dish-like member 2 and inner dish-like member 3. Specifically, as shown, this outer reinforced region 14 carries the previously-mentioned grooves 9 and the under cut or enlarged end zones 10 of the anchorage 6.

The middle support zone 4 of the outer dish 2 is designed to have a generally T-shaped configuration. The cross beam portion of this T-shaped structure has in its two end regions the inner anchorages 6' which likewise have the form of inwardly extending grooves or slots 9 with under cut or enlarged end zones 10 which correspond to those previously discussed with respect to anchorages 6.

Extending between the outer leg 13 of the U-shaped zone 11 and the reinforced area 14 is a rib 15 which serves as a reinforcement between parts 13 and It is evident from FIGS. 1 and 3 that the inner dish-like element 3 is designed to have a ring-shape in the area of storage location 5. Specifically, the dish-like element 3 has this ring-shaped portion sized and shaped for the receipt of tube-like members to extend axially therethrough. Each of the storage locations 5, as defined by the ring-shaped areas 16, include an insert aperture 17 for receiving the tube-shaped parts to be supported and stored. At the ends of the ring-shaped area 16 of storage location 15 of inner dish-like element 3, separate connecting portions integral therewith extend over to the inner and outer anchorages 6, 6', i.e., into the two engagement elements furnished with thickened end regions. Furthermore, it can be seen that the ring-shaped region 16 has on both sides of storage location 5 a thickening or tab-like portion which extends somewhat into the open central portion of the ring-shaped region and which reduces the aperture 17. Additionally, at the inner circumference of the ring-shaped area 16, there may be located a rib 19 which extends longitudinally of the central opening and in a position substantially opposite insert aperture 17. In addition, this tab or rib 19 is located somewhat opposite the two earlier mentioned tabs adjacent the insert aperture 17. As can be seen, a tube-shaped part can thus be forced into the insert aperture 17 over the thickened portions or tabs 18 into the inner space of the ring-shaped region 16 of storage location 5. Thus, the tube-shaped part merely abuts the two thickenings or tab portions 18 and the rib 19 and is thus supported from these three separate elements in somewhat point or line-type contact. Since the embedded tube-shaped part of outer dish-like element 2 in storage location 5 of inner dish-like element 3 is comprised of soft, resilient plastic material and is spaced from the outer dish-like element 2 because of the free area 7, there is little possibility of transmitting undesirable vibrations from the tube-like element to the associated support. Thus, when the element is used, for example, for supporting a fuel line in the body of a motor vehicle, there is little possibility that vibrations will be transmitted from the pipe or fuel line to the motor vehicle frame. On this basis, excellent damping of undesirable vibrations and the transmission thereof is assured.

In addition, the holding zone 4 of the outer dish-like element 2 as shown in FIG. 3 generally comprises an aperture 20 with longitudinally extending ribs. This arrangement allows the entire assembly to be driven onto a saw tooth bolt previously connected to the vehicle frame or body panels. It should be appreciated, however, that the holding zone could comprise other well known types of connecting means instead of the aperture 20 shown. For example, the holding zone could comprise various clips, profiled bolts, bolts or the like.

The connection between the hard outer dish-like element 2 and the soft inner dish-like element 3 can be made by mechanically inserting the inner dish-like element 2 into the outer dish-like element 3 and manually placing the free ends of the inner dish-like element into the slots or grooves 9. Alternatively, it is possible for simultaneously making the connection and forming the components by the use of the well known two-component extrusion molding process. In this way, during the manufacturing, a connection between the soft inner dish-like element 3 and the hard outer dish-like element 2 can be achieved automatically.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A holding assembly for mounting and supporting tube-shaped parts from a subjacent support comprising:

a first outer dish-like component formed of a relatively hard rigid material and including a holding portion for connection to said subjacent support;

a second dish-like component formed of a soft resilient plastic material and supported in said first component by spaced anchorage points, said second component defining laterally open storage zones between said anchorage points, said storage zones adapted to receive and hold tube-shaped parts therein with the second component formed to provide an insertion aperture for each storage zone allowing tube-shaped parts to be placed into the respective storage zone, each insertion aperture being narrower than the respective storage zone and defined by opposed tab-like portions;

an open free space between said first and second components in the area about said storage zones, the holding portion being located between the two storage zones and the second dish-like component joined to the first component with four anchorage points of which two anchorage points are located above the holding portion and two anchorage points are located at a distance laterally spaced from the holding portion such that each storage zone is independently supported by a spaced pair of anchorage points with said open free space extending between the spaced pair of anchorage points.

2. A holding assembly according to claim 1 wherein the anchorage points are formed by grooves with undercut end zones and corresponding engagement elements equipped with thickened end zones.

3. A holding assembly according to claim 1 wherein the anchorage points located on both sides of the storage zone face in opposite directions.

4. A holding assembly according to claim 1 wherein the first component has an inverted T-shape and the cross beam of the T has its two end regions forming anchorage points between the first and second dish-like components.

5. A holding assembly according to claim 1 wherein the second dish-like component is ring-shaped in the area of each storage zone.

6. A holding assembly according to claim 5 wherein there is located at the inner circumference of each ring-shaped portion a rib positioned opposite respective insert aperture.

* * * * *